April 2, 1957 J. BERLIN ET AL 2,787,761
ELECTRONIC TUBE TESTING APPARATUS
Filed June 23, 1955
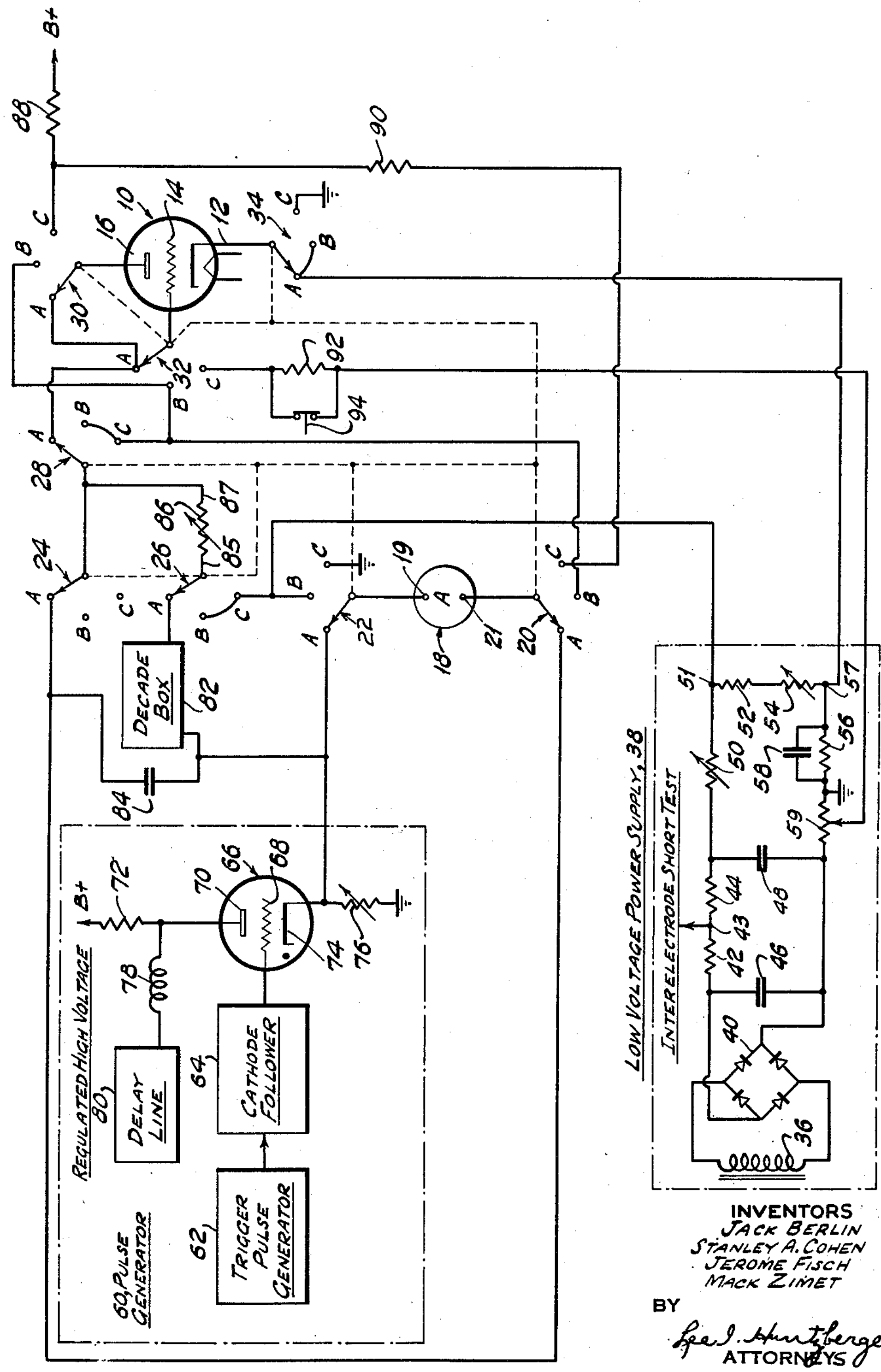
INVENTORS
JACK BERLIN
STANLEY A. COHEN
JEROME FISCH
MACK ZIMET
BY
ATTORNEYS United States Patent Office 2,787,761

Patented Apr. 2, 1957

1

2,787,761

ELECTRONIC TUBE TESTING APPARATUS

Jack Berlin, Brooklyn, Stanley A. Cohen, Cambria Heights, Jerome Fisch, Queens Village, and Mack Zimet, Brooklyn, N. Y., assignors to the United States of America as represented by the Secretary of the Navy Application June 23, 1955, Serial No. 517,670

1 Claim. (Cl. 324—23)

(Granted under Title 35, U. S. Code (1952), sec. 266)

The invention described herein may be manufactured and used by or for the Government of the United States of America for governmental purposes without the payment of any royalties thereon or therefor.

This invention relates to electronic tube testing apparatus and more particularly to such apparatus embodying a single indicating meter for measuring a plurality of different characteristics of individual coaxial and planar electronic tubes intended for use in microwave circuitry.

The primary object of the present invention is to provide an apparatus embodying a single indicating instrument which enables a simple determination of the suitability for use of coaxial and planar electronic tubes intended for operation at high frequencies.

Another object is to provide an apparatus embodying a single meter for expeditiously testing planar and coaxial tubes intended for operation at frequencies in excess of 1000 megacycles which includes circuits adapted for ascertaining the pulse emission, direct current emission and presence of gas in such tubes for a given set of circuit parameters.

In accordance with the present invention, there is provided an apparatus for testing an electronic tube intended for microwave operation. It includes a circuit for testing pulse emission characteristics, a circuit for testing direct current emission characteristics, a circuit for testing the degree of gas present, an instrument for indicating various current values, means for selectively calibrating the instrument for each of the tests and means for selectively coupling one of the circuits and the instrument to the tube to effect an indication on the instrument.

Also, in accordance with the present invention, there is provided an apparatus adapted for use in testing an electronic tube intended for microwave operation. It includes a low voltage power supply which comprises a full wave bridge rectifier having a source of alternating current voltage applied thereto, means coupled to the output of the rectifier for filtering the output thereof, and a voltage divider coupled to the output of the filtering means, the voltage divider comprising a first variable resistor, a second fixed resistor, a first junction point therebetween, a third variable resistor, a fourth fixed resistor, a second junction point therebetween and a fifth variable resistor, the junction point of the fourth and fifth resistors being grounded. A circuit is included which is adapted for testing pulse emission characteristics of the tube when coupled thereto comprising a pulse generator, the latter consisting of a blocking oscillator, a thyratron having a series combination of an inductance and a delay network in its plate circuit and a sixth variable non-inductive cathode resistance, and a cathode follower having its input connected to the output of the blocking oscillator and its output connected to the thyratron. There are also included circuits adapted for determining the direct current emission characteristics of and the degree of gas present in the tube when either of the circuits are coupled thereto. A single instrument is provided for indicating various current values thereon when the instrument is coupled with one of the circuits to the tube. Means are provided for selectively calibrating the instrument comprising resistors associated therewith. There is included multiposition switching means for selectively coupling one of the circuits and the instrument to the tube to effect an indication on the instrument. The switching means has a first position for connecting the grid and plate of the tube, for applying the output of the thyratron to the tube plate, for connecting the cathode to the second junction point and for connecting the instrument between the thyratron and the tube plate. The switching means has a second position for connecting the tube grid and plate, for connecting the tube plate to the first junction point and the cathode to the second junction point and for connecting the instrument between the tube plate and the first junction point. The switching means has a third position for connecting the cathode to ground, for connecting the tube plate to a source of positive potential, for connecting the grid to a point on the fifth resistor through a seventh resistor, and for connecting the instrument cross the tube plate and cathode.

Other objects and many of the attendant advantages of this invention will be readily appreciated as the same becomes better understood by reference to the following detailed description when considered in connection with the accompanying drawing wherein there is schematically depicted an embodiment of an apparatus constructed in accordance with the present invention.

Referring now to the drawing, the apparatus of the invention includes a regulated high voltage power supply circuit (not shown), a low voltage power supply circuit, a pulse generator circuit, a circuit adapted for testing direct current emission, a circuit adapted for determining the degree of gas present, an indicating instrument which is used in conjunction with these circuits and ganged switches for coupling the tube to be tested in circuit with the specific testing circuit, the proper voltage supply and the indicating instrument. A conventional circuit for determining the presence of interelectrode shorts in a tube under test, as found in tube testers generally may be provided. The tube to be tested is an electronic vacuum tube 10 having at least a cathode 12, and a plate 16 and where triodes are tested, a grid 14. The instrument 18 is a microammeter such as 0 to 500 microampere meter having a nominal resistance of 250 ohms. The ganged switches 20, 22, 24, 26, 28, 30, 32 and 34 are depicted for convenience in the drawing as three position switches but it is understood that they may consist of several more positions. For example, with the provision of a circuit for testing interelectrode shorts in the tube, at least a fourth position would be required.

The apparatus preferably is designed to operate over a range of alternating current line voltage and is conveniently utilized in conjunction with the conventional source of alternating current which may include a transformer, the leads of the primary winding thereof being connected to a wall socket plug so that the apparatus may be energized from a 115 volt alternating current lighting circuit. The transformer preferably includes a plurality of secondary windings. Since such power source is well known it is believed unnecessary to illustrate it diagrammatically and the drawing shows only that secondary winding 36 of the transformer which supplies power for the low voltage power supply circuit 38 of the apparatus. Low voltage power supply circuit 38 comprises a full wave bridge rectifier 40, the output of which is applied to a pi filter consisting of a series arrangement of resistors 42 and 44 and a parallel arrangement of capacitors 46 and 48. The output of the pi filter is applied to a consecutive series arrangement of a variable resistor 50, a resistor 52, a variable resistor 54, a resistor 56, shunted by a capacitor 58, and a tapped resistor 59. The junction point of resistors 56 and 59 is grounded so that a negative voltage bias may be provided by tapping a point on resistor 59. Circuit 38 is utilized to activate the low voltage circuits in the apparatus and in a specific embodiment of the present invention, may be employed to develop about at least 10 to 20 volts for the direct current emission test, four volts fixed voltage bias for the pulse emission test, and 0 to −25 volts grid voltage bias for the gas test as will be further explained herein below. In the event that it is desired to include a conventional circuit for making the usual test for tube interelectrode shorts, a desired voltage may be provided therefor by tapping the junction point 43 of resistors 42 and 44. Low voltage circuit 38 is so constructed as to compensate for constructional variation and aging that may occur therein. For example, assuming that it is desired to fix the internal resistance thereof utilizing a current of 100 milliamperes, the value of the resistors in the circuit would be resistor 42, 250 ohms, resistor 44, 500 ohms, resistor 50, 500 ohms, resistor 52, 100 ohms, resistor 54, 200 ohms, resistor 56, 40 ohms, and resistor 59, 250 ohms. The adjustment is made by varying resistor 50 until the sum of resistors 50, 42, 44, 56, and 59, plus the internal resistance of rectifier circuit 40 equals 1630 ohms. Assuming that the alternating current line voltage is 115 volts, the power supply E equals 115 times the square root of 2 or 163 volts and with 1630 ohms in the circuit, the current is equal to 100 milliamperes. In the specific embodiment as outlined, a tap at the junction point 43 of resistors 42 and 44 provides a voltage of 100 volts, a tap at the junction point 57 of resistors 56 and 58 provides a voltage of 4 volts and the voltage developed across resistors 52 and 54 is at least 10 to 20 volts depending upon the setting of variable resistor 50.

The pulse emission test circuit comprises a pulse generator 60 which consists of a trigger pulse generator designated by block 62 and which may comprise any well known device of this nature such as a blocking oscillator or a multivibrator. The output of trigger pulse generator 62 is applied to the grid 68 of a thyratron 66 through a cathode follower 64 which serves both as a matching device and to make the repetition rate of trigger pulse generator 62 independent of the pulse generator load. The plate 70 of thyratron 66 is connected to the B+ terminal of a regulated high voltage source through a resistor 72, and the cathode 74 of thyratron 66 is connected to ground through a variable resistor 76. A series combination of an inductance 78 and a delay network 80 is connected between plate 70 and ground. In a specific embodiment of the pulse generator, the trigger pulse generator is adjusted to give a duty cycle of about 0.001. The high voltage B+ source is equal to 1000 volts, resistor 72 has a value of 25K ohms, variable resistor 76 is equal to 25 ohms, and inductance 78 is equal to 5.5 microhenrys. The output of thyratron 66 developed across resistor 76 consists of positive pulses whose magnitude can be varied in this embodiment from 0 to 350 volts with an approximate width of two microseconds as determined by delay network 80. It is to be noted that resistor 76 must be noninductive. Otherwise, great distortion of the pulse shape might occur due to oscillations set up in the pulse output.

*Evaluation of pulse emission characteristics*

To make this evaluation, the connectors of ganged switches 20, 22, 24, 26, 28, 30, 32 and 34 are moved to position A. The drawing shows the connectors already in the A position. As a result, plate 16 of tube 10 which is connected to the connector of its associated switch 30 is tied to grid 14. Cathode 12 which is connected to the connector of its associated switch 34 is connected to ground through the parallel combination of resistor and capacitor 58 so that in considering the specific embodiment of low power voltage supply circuit 38 outlined above cathode 12 is at +4 volts. One terminal 19 of meter 18 which is connected to the connector of its associated switch 22 is connected both to the cathode 74 of thyratron 66, one end of a decade box 82, and one end of a capacitor 84. The other terminal 21 of meter 18 which is connected to the connector of its associated switch 20 is connected to the other end of capacitor 84. Decade box 82 is connected to one end 85 of variable resistor 86 which is connected to the connector of its associated switch 26. The other end 87 of resistor 86 is connected to grid 14 through the connectors of switches 28 and 32, switch 32 being associated with grid 14. The other end of capacitor 84 is connected to the connector of switch 24 and when the connectors are in the A position as shown, capacitor 84 is connected across the series arrangement of decade box 82 and variable resistor 86, and across meter 18. Capacitor 84 serves as a bypass for the trigger pulse generator. Variable resistor 86 preferably has a value of about 10 ohms and is utilized as a variable shunt for meter 18. In operation, a positive pulse developed across resistor 76 is applied to the plate of tube 10, the amplitude of the pulse being determined by the adjustment of resistor 76. In taking an example of a specific tube, assume that a barely satisfactory tube 10 such as a 2C42 gives four amperes of current for a 250 volt pulse applies thereto thus exhibiting a tube resistance $R_t$ of 62.5 ohms. Now, further assuming that the resistance of resistor 76 has to be 16 ohms to provide 250 volts to tube 10, since resistor 76 is in parallel with tube, the value of resistor 76 should be $$\frac{16\times 62.5}{62.5-16}$$

or 21.7 ohms. In the case of an exceptionally good tube, since the latter's tube resistance is lower, there is a limiting action which decreases the voltage applied to the tube, which in almost all cases prevents off-scale meter deflections. In the interval between pulses, the current of tube 10 is cut off due to the bias voltage developed across resistor 56. For example, if resistor 56 has a value of 40 ohms and a current of 100 milliamperes flows in low voltage power supply circuit 38, 4 volts are developed across resistor 56. This bias voltage prevents current from flowing in the circuit due to high velocity electrons leaving the cathode with no direct current voltage on the tube.

With reference to the meter, it has been found convenient to designate 0 to 200 microamperes readings as indicating a bad tube and 200 to 500 microamperes as indicating a marginal to good tube. Resistor 86, the meter shunt may be so designed that the differentiating value of current between a "bad" or "good" tube is 200 microamperes. For example, considering the aforementioned poor 2C42 tube, the average tube current is milliamperes when the meter shows a reading of 200 microamperes. The shunt current is therefore 3.8 milliamperes. Now, assuming that the meter resistance is 250 ohms, the total shunt resistance is equal to $250\times 0.2/3-8$ or 13.1 ohms. If each step of the decade box has a resistance of 10 ohms, the remainder of the resistance, 3.1 ohms, is the value of adjustable resistor 86.

*Evaluation of direct current emission*

To make this evaluation, the connectors of switches 20, 22, 24, 26, 28, 30 and 32 are moved to position B. As a result, plate 16 of tube 10 is tied to grid 14, through the switches 30 and 32. Terminal 19 of meter 18 is connected to grid 14 through the connector of switch 22, the connector of switch 26, variable resistor 86, the connector of switch 28 and the connector of switch 32. Terminal 21 is connected to plate 16 and to junction point 51 between variable resistor 50 and resistor 52, capacitor 84 and decade box 52 are removed from the circuit as positions B and C of switch 24 are floating positions. Cathode 12 is connected by junction point 57 through the connector of switch 34. Thus, if resistor 52 has a value of 100 ohms and variable resistor 54 has a value of 200 ohms, at least a voltage of from 10 to 20 volts may be applied across plate 16 and cathode 12.

In operation, assuming that a barely satisfactory tube such as a marginal 2C40 gives a tube current of 40 milliamperes for a plate voltage of 10 volts. Now considering the specific example of the low voltage power supply circuit where the sum of the resistances is 1630 ohms and the current is 100 milliampere giving a voltage of 163 volts, the current supplied is 163 minus 10 or 153 volts divided by 1630 ohms minus the resistance value of resistors 52 and 54 or 1330 ohms which is 115 milliamperes. The tube shunt current is then 115 minus 40 or 75 milliamperes. Resistors 52 and 54 equal 10 volts divided by 75 milliamperes or 133 ohms. Now if resistor 52 is fixed at 100 ohms, resistor 54 is adjusted to 33 ohms. The question of whether a tested tube is "good" or "bad" will be indicated in the same manner on meter 18 as in the pusle emission evaluation. The setting of the resistor 86 may be calculated as previously outlined.

*Gas measurement test*

In this test, the connectors of switches 20, 22, 24, 26, 28, 30, 32 and 34 are moved to position C. As a result, plate 16 of tube 10 is connected to a B+ source through the connector of switch 30 and a resistor 88, terminal 21 of meter 18 is connected to plate 16 through the connector of switch 20 and a meter multiplier resistor 90. Terminal 19 and cathode 12 are connected to ground. Grid 14 is connected to variable resistor 59 through the connector of switch 32 and a resistor 92, resistor 92 being normally shorted by button 94. Assuming that resistor 59 has a value of 250 ohms, since it is below ground, the voltage developed thereacross may vary from 0 to minus 25 volts when the current in low power supply circuit 38 is equal to 100 milliamperes. In operation, if it is decided, for example, that about 2 microamperes of grid gas current for the average tube whose transconductance is about 1500 micromhos at a plate current of 1.5 milliamperes would be indicative of a marginal tube, grid bias resistor 59 is adjusted until the current in tube 10 is 1.5 milliamperes. Consequently, a tube current of 1.5 milliamperes may be indicated by a reading of 250 microamperes on meter 18 if the value of meter multiplier resistor 90 is 500K ohms, and plate resistor 88 has a value of 100K ohms. The B+ voltage should be equal to 300 volts so that when the tube current is 1.5 milliamperes, the voltage across resistor 90 is 125 volts. Button 94 is then depressed to unshort resistor 92 which may have a value of 100K ohms. If the tube is gassy, the gas ion current attracted to grid 14 causes a voltage drop across resistor 92 which decreases the grid bias. Consequently, the plate current increases, the plate voltage decreases, and indicator of meter 18 dips since the meter in series with resistor 90 is connected across the tube plate voltage. Now, if the plate current undergoes an increase in excess of 0.3 milliampere, an amount sufficient to "fail" the tube, the tube is rejected since the meter dips to the lower end of the scale due to resistors 88 and 90 and the plate voltage. To provide a variation of plate current, $\Delta i_p$ of 0.3 milliampere for a gas current of 2 microamperes, it is seen that the change in grid bias, $\Delta e_q$ which is necessary is equal to 0.3 divided by the transconductance, 1500 micromhos, which equals 0.2 volt. Consequently, for a gas current of 2 microamperes, resistor 92 must equal 0.2 volt divided by 2 microamperes or 100K ohms.

It is to be understod of course, that the operator of the apparatus of the present invention need only change the position of the switches to perform any of the specific tests or evaluation. The settings for adjustable thyratron cathode resistor 76, meter shunt resistor 86, resistors 50 and 54 and grid bias resistor 59 are readily calculated for various test situations and dials may be provided which are calibrated in accordance with such calculations. Thus the operator in addition to switching for the various tests, merely makes dial settings set out in a chart or any other convenient manner.

From the foregoing description, it will be apparent that an apparatus constructed in accordance with the invention enables the expeditious and simple testing of microwave electronic tubes for pulse emission characteristics, direct current emission characteristics and degree of presence of gas and embodying a single indicating instrument.

Obviously many modifications and variations of the present invention are possible in the light of the above teachings. It is therefore to be understood that within the scope of the appended claim the invention may be practiced otherwise than as specifically described.

We claim:

An apparatus adapted for use in checking an electronic tube having at least a plate, a grid and a cathode, said apparatus comprising low voltage, direct current, filtered power supply having a voltage divider connected across the output thereof, said voltage divider including a first variable resistor, a second fixed resistor, a first junction point between said first and second resistors, a third variable resistor, a fourth fixed resistor, a second junction point between said third and fourth resistors, and a fifth variable resistor, the junction point of said fourth and fifth resistors being connected to a source of reference potential; pulse circuitry including a thyratron, a series-connected inductance and delay network connected to the plate of said thyratron, and a sixth variable non-inductive resistance connected between the cathode of said thyratron and the source of reference potential, a trigger pulse generator, a cathode follower having its input connected to the output of said trigger pulse generator and its output connected to the input of said thyratron; conductive means adapted for connecting said apparatus to the electronic tube for checking pulse emission characteristics, cathode emission, and the degree of gas present in the tube; a seventh resistor, a normally closed manually operable switch bridging said seventh resistor; an ammeter; resistor means for selectively calibrating said ammeter; and multiposition switching means for selectively coupling said apparatus to the tube whereby said ammeter indicates the condition of said tube; said switching means having a first position for connecting the grid to the plate of the tube through said conductive means and for applying the output of said thyratron through said ammeter to the plate of the tube through said conductive means and for connecting the cathode of the tube to said second junction point through said conductive means, for checking pulse emission, said switching means having a second position connecting the plate and grid of the tube through said conductive means for connecting the cathode of the tube to said second junction point and for connecting said ammeter and calibrating resistor means in parallel between plate of the tube and said first junction point through said conductive means for checking cathode emission, said switching means having a third position for connecting the cathode of the tube to a source of reference potential through said conductive means and for connecting the plate of the tube to a source of positive potential and for connecting the grid of the tube in series with said seventh resistor bridged by the noramlly closed switch and a point on said fifth resistor through said conductive means and for connecting said ammeter between the plate and cathode of the tube through said conductive means whereby when said normally closed switch bridging said seventh resistor is opened an indication of the degree of gas present is obtained on said ammeter.

References Cited in the file of this patent

UNITED STATES PATENTS

| | | |
|---|---|---|
| 2,616,058 | Wagner | Oct. 28, 1952 |
| 2,632,134 | Reid | Mar. 17, 1953 |